US006439752B1

(12) United States Patent
Petrick

(10) Patent No.: US 6,439,752 B1
(45) Date of Patent: Aug. 27, 2002

(54) HIGH INTENSITY DISCHARGE AIRCRAFT LANDING AND TAXI LIGHT SYSTEM, METHOD AND COMPONENTS

(75) Inventor: John T. Petrick, Oldsmar, FL (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 09/471,552

(22) Filed: Dec. 23, 1999

(51) Int. Cl.$^7$ ............................................... B64D 47/02
(52) U.S. Cl. ........................ 362/470; 362/263; 362/265; 362/299; 362/538; 362/327; 313/570; 313/594
(58) Field of Search ................................. 362/470, 472, 362/263, 265, 298, 299, 303, 538, 539, 339, 327; 313/594, 113, 570

(56) References Cited

U.S. PATENT DOCUMENTS

| 2,265,095 | A |   | 12/1941 | Adler, Jr. |         |
|-----------|---|---|---------|------------|---------|
| 3,767,309 | A | * | 10/1973 | Brown et al. | 340/26 |
| 4,367,514 | A | * | 1/1983  | Large et al. | 362/268 |
| 4,495,549 | A |   | 1/1985  | Carlson et al. | 362/470 |
| 4,800,467 | A |   | 1/1989  | Lindae et al. |        |
| 4,866,329 | A |   | 9/1989  | Ferenc     | 313/113 |
| 5,103,381 | A |   | 4/1992  | Uke        | 362/560 |
| 5,355,131 | A | * | 10/1994 | Metz et al. | 340/981 |
| 5,683,175 | A |   | 11/1997 | Golz       | 362/338 |
| 5,869,920 | A |   | 2/1999  | Kavanaugh  | 313/113 |
| 6,127,782 | A | * | 10/2000 | Flory, IV et al. | 315/129 |

FOREIGN PATENT DOCUMENTS

| EP | 0374846  | 6/1990  |
|----|----------|---------|
| FR | 2704938  | 11/1994 |
| WO | 00/48904 | 8/2000  |

\* cited by examiner

*Primary Examiner*—Sandra O'Shea
*Assistant Examiner*—Ronald E. DelGizzi
(74) *Attorney, Agent, or Firm*—Renner, Otto, Boisselle & Sklar, LLP

(57) ABSTRACT

A method for replacing non-HID landing and taxi lights in an aircraft wing housing that originally was designed to contain the non-HID landing and taxi lights in side-by-side relationship, is accomplished by installing an HID landing light, an HID taxi light and a power control device in the space originally designed to accommodate the non-HID landing and taxi lights. A single ballast provides power to both lamps which each comprise a housing, an HID bulb supported within the housing, a lens for passage of light from the HID bulb out of the housing, a primary reflector surface disposed behind the HID bulb, and a secondary reflector surface disposed in front of the bulb for reflecting light from the bulb back through the bulb for further forward reflection from the primary reflector surface through the lens. The lens may have a lenticular array including a plurality of cylindrical surface elements for spreading the light beam emitted by the lamp. An HID igniter may be located within the lamp's housing behind the reflector surface and electrically connected to the HID bulb.

14 Claims, 8 Drawing Sheets

HIGH INTENSITY DISCHARGE AIRCRAFT LANDING AND TAXI LIGHT SYSTEM, METHOD AND COMPONENTS

The invention herein described relates generally to aircraft lighting systems and, more particularly, to an aircraft lighting system employing one or more high intensity discharge lamps and the construction of such lamps.

BACKGROUND OF THE INVENTION

High intensity discharge (HID) lamps offer significant advantages over other lamps conventionally used in aircraft applications, such as quartz halogen or incandescent sealed beam lamps used as utility/cargo bay lights, wing and engine scan lights, logo lights, landing lights and taxi lights. When compared with quartz halogen lamps, HID lamps provide (i) nearly twice the photometric performance at less than half the energy consumption, (ii) extended lamp life by a factor of about four, (iii) better shock resistance and (iv) less heat generation. Although HID lamps have been successfully used in automotive applications, they generally have been unsuitable for use in aircraft applications for various reasons including a requirement for a larger envelope than the existing quartz halogen or incandescent sealed beam lamps presently in use.

The present invention provides a method for replacing non-HID landing and taxi lights in an aircraft wing housing that originally was designed to contain the non-HID landing and taxi lights in side-by-side relationship. This is accomplished by installing an HID landing light, an HID taxi light and a power control device in the space originally designed to accommodate the non-HID landing and taxi lights. In a particular embodiment, the HID landing and taxi lights are installed in the space originally designed to be occupied by one of the non-HID landing lights, and the power control device is installed in the originally designed to be occupied by the other of the non-HID landing lights.

Accordingly, the invention also provides an aircraft landing and taxi light system comprising an HID landing lamp, an HID taxi lamp and HID lamp power control circuitry for the lamps, wherein the landing lamp, taxi lamp and power control circuitry are mounted in a common housing. In a particular embodiment, the power control circuitry includes a ballast, and the ballast is housed in the enclosure separate from the lamps, which lamps may each include an ignitor as a part thereof that is connected by a cable to a separately mounted ballast.

According to a further aspect of the invention, an HID lamp comprises a housing, an HID bulb supported within the housing, a lens for passage of light from the HID bulb out of the housing, a primary reflector surface disposed behind the HID bulb, and a secondary reflector surface disposed in front of the bulb for reflecting light from the bulb back through the bulb for further forward reflection from the primary reflector surface through the lens. In a particular embodiment, the primary reflector is a parabolic reflector surface and the HID bulb has an arc located at about the focal point of the primary reflector surface. The secondary reflector surface preferably is a concave spherical surface having a radius of curvature less than the focal length of the parabolic reflector, and the secondary reflector surface is integral with the lens while the primary reflector surface is integral with the housing. In addition, the lens may have a lenticular array including a plurality of cylindrical surface elements for spreading the light beam emitted by the lamp.

According to yet another aspect of the invention, an HID lamp comprises a housing, an HID bulb supported within the housing, a lens for passage of light from the HID bulb out of the housing, a reflector surface disposed behind the HID bulb, and an HID ignitor located within the housing behind the reflector surface and electrically connected to the HID bulb.

The foregoing and other features of the invention are hereinafter fully described and particularly pointed out in the claims, the following description and the annexed drawings setting forth in detail one or more illustrative embodiments of the invention, such being indicative, however, of but one or a few of the various ways in which the principles of the invention may be employed.

DETAILED DESCRIPTION

Figure 1:
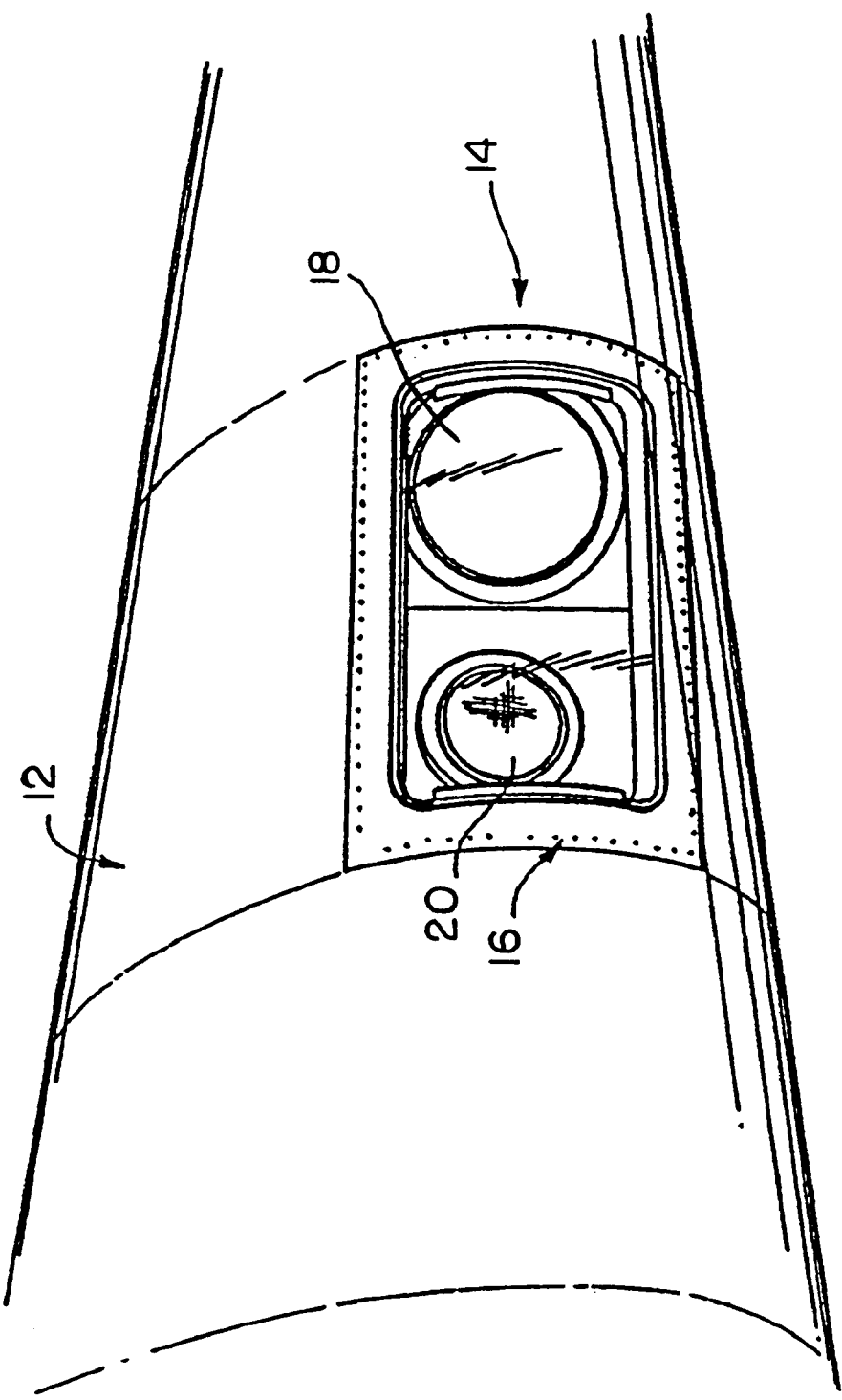
FIG. 1 is a perspective view of a portion of an aircraft wing showing a prior art landing and taxi light module.

Referring now in detail to the drawings, FIG. 1 shows an aircraft wing 12 enveloping the front of a prior art aircraft landing and taxi light module 14. The module 14 includes a housing 16 in which a landing lamp 18 and a taxi lamp 20 are mounted. Such modules heretofore have used quartz halogen or incandescent sealed beam lamps. These lamps are usually very powerful lamps; a typical landing lamp having a rating of on the order of 600,000 candle power and a typical taxi lamp on the order of 75,000 candle power.

Figure 2:
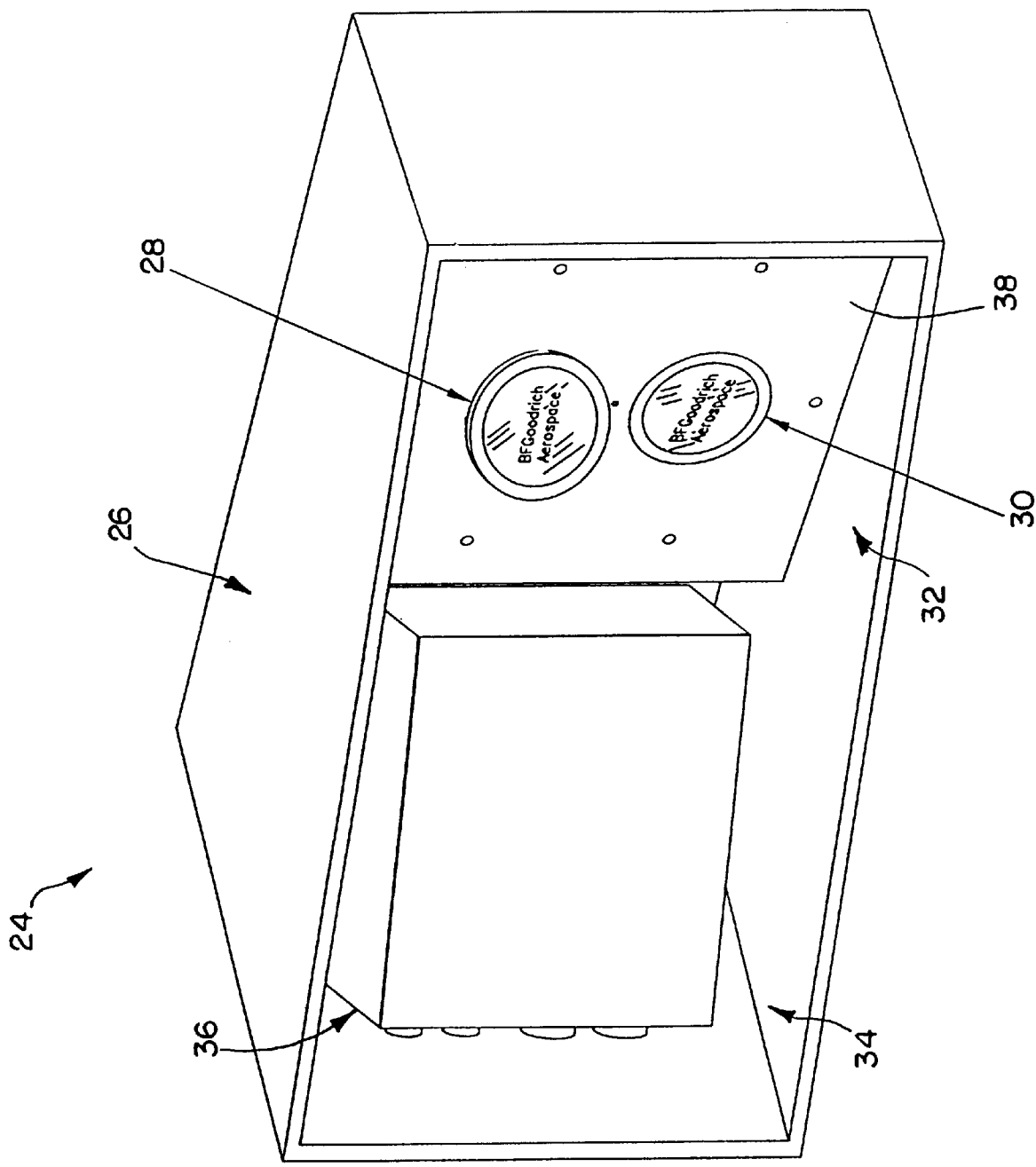
FIG. 2 is perspective view of a front perspective view of a landing and taxi light module that can be used in place of the prior art module shown in FIG. 1.

FIG. 2 shows a landing and taxi light module 24 according to the invention, that can be used in place of the prior art module 14 shown in FIG. 1. The module 24 includes a housing 26 in which a landing lamp 28 and a taxi lamp 30 are mounted. The lamps 28 and 30 are HID lamps and thus a smaller size lamp can be used to deliver the same amount of light as the prior art quartz halogen or incandescent sealed beam lamps. As a result, both lamps can be mounted in the space 32 normally occupied by just one of the prior art lamps, such as the larger landing lamp (typically a PAR 64). The space 34 normally occupied by the other of the prior art lamps, such as the taxi light, is available for mounting a power control unit 36 for the lamps 28 and 30. The housing 26 may be an existing housing in the aircraft modified as needed to receive and mount the lamps and power control unit. An adaptor housing 38 may be provided to receive and removably mount the lamps as shown. Although not shown, suitable adjustment hardware may be. provided for aiming the lamps as needed.

Figure 3:
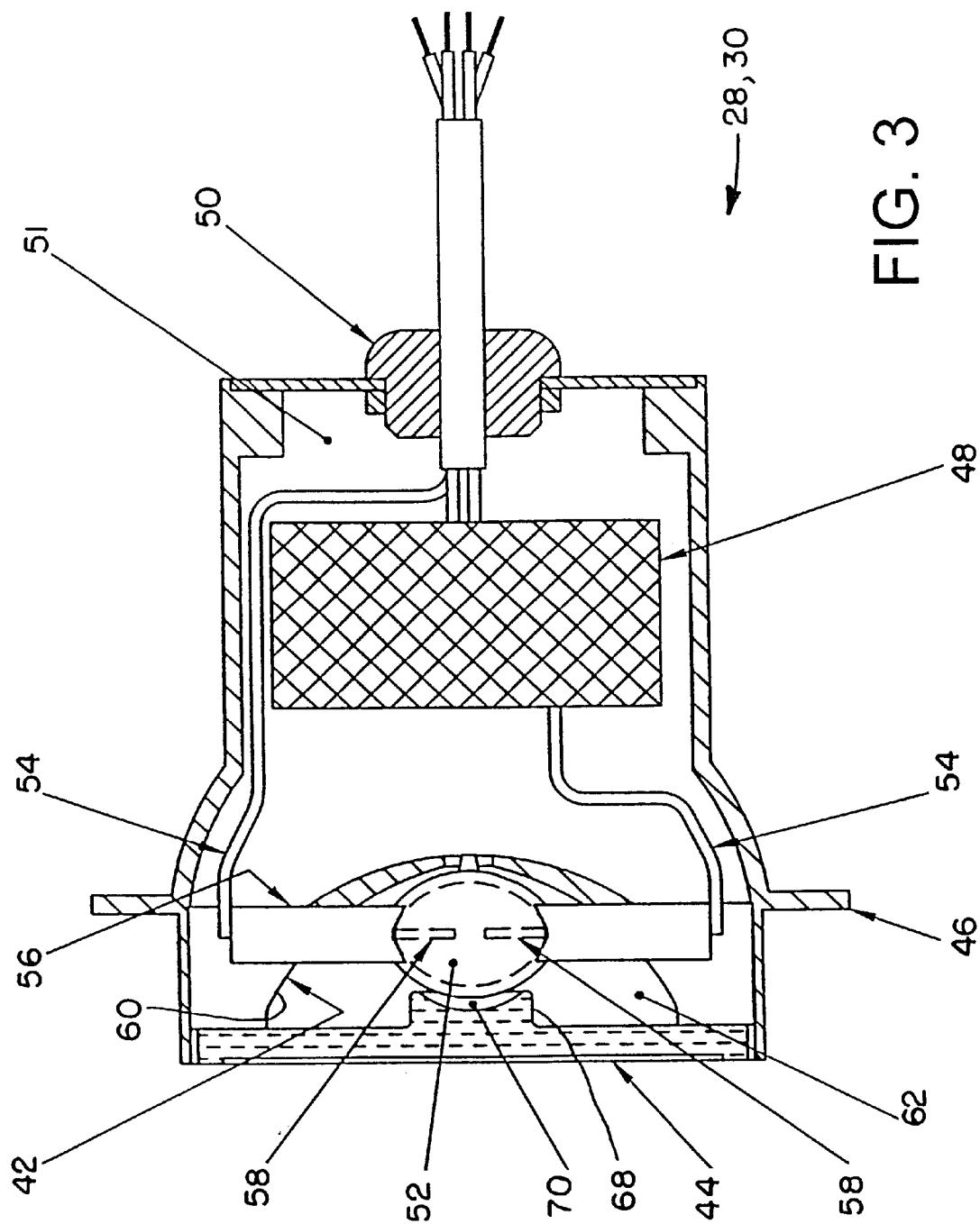
FIG. 3 is a cross-sectional view of an HID lamp unit used in the module of FIG. 2.
Figure 4:
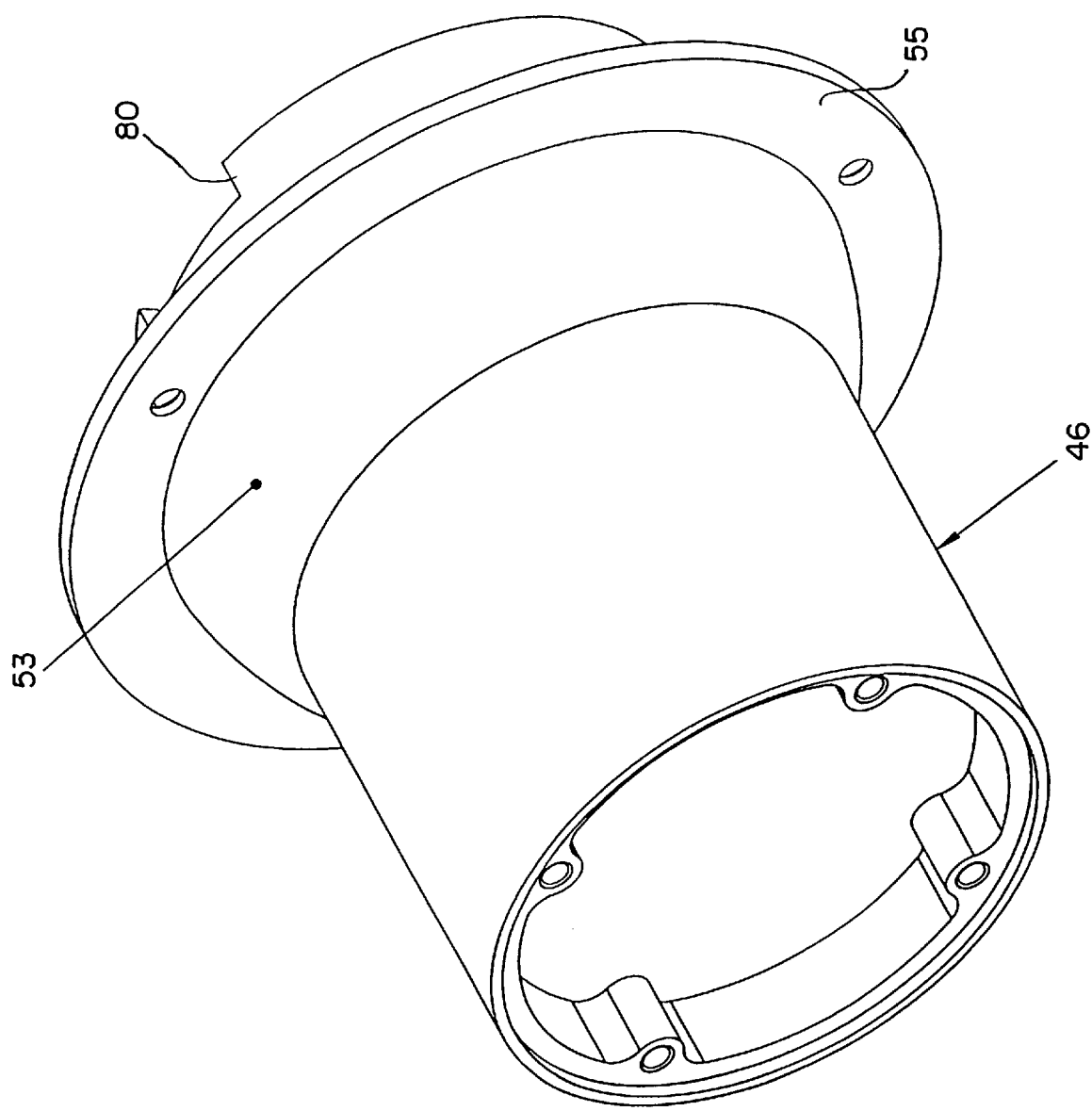
FIG. 4 is a rear perspective view of the HID lamp unit of FIG. 3, with the lens thereof not shown.

FIG. 3 shows an exemplary lamp construction according to the invention. One or both of the lamps 28 and 30 can have the construction illustrated in FIG. 3. Accordingly, each lamp 28, 30 generally comprises a reflector 42, a cover lens 44, a housing 46, electronics 48, electrical feedthrough 50 and an HID bulb 52. The HID bulb may be for example a metal halide bulb and preferably the bulb has a power rating greater than 50 Watts for use as a taxi and/or landing light. The bulb for the taxi light typically will be about 75 Watts or higher and the bulb for the landing light typically will be about 150 Watts or higher. The housing 46, as seen in FIG. 4, preferably has a spherical portion 53 which engages a similarly shaped surface on the housing 26 to permit aiming adjustment over a range of angles using adjusting screws attached to a mounting flange 55 circumscribing the housing 46.

The electronics 48 may include any part of the power control circuitry used to operate the lamp. The power control circuitry includes a ballast and ignitor that control start-up and operation of the HID lamp 52, including the illuminating power and color stability, through a microprocessor (or equivalent control and monitor circuit). It also controls the lamp voltage during continuous or steady state operation. The HID lamp ballast may operate on 115 VAC 400 Hz single phase power, for example. Lamp ignition may be effected by applying to the HID lamp high frequency 2 kHz, 30 kV high voltage pulses, in 200 ms. The bursts may be immediately truncated the moment the lamp is lit. The bursts may be repeated once each second if the lamp fails to light. In the case of a malfunctioning lamp, the igniter may stop after a preset time, typically 15 seconds. Then further attempts to re-light the lamp may be discontinued until, for instance, the main power has been manually cycled.

Preferably, the electronics 48 include the ignitor while the ballast is located in the power control unit 36. By housing the ignitor circuit components with the lamp, such as within a cavity 51 in the housing 46, the distance through which high voltage must travel to effect lamp startup is minimized.

The bulb 52 is connected to lead wires 54 and is further held in position by supports 56 with the arc gap between the bulb electrodes 58 at about the focal point of the reflector 42 which has a parabolic reflective surface 60. In the illustrated embodiment, the reflector is formed as a part of the housing 46 which may be made of a metallic aluminum composition which may be polished and coated to form the reflective surface using commercially available techniques. However, the reflector may be otherwise formed such as by a parabolic shape body interiorly coated with a glass glaze and fired to an optical finish, with reflectivity being obtained by using a vacuum deposited aluminum overlay and a secondary coating such as magnesium fluoride using conventionally available techniques. Still other techniques may be used to form the reflective surface within the lamp structure.

The reflector 42, or more generally the housing 26, has affixed thereto the cover lens, as by means of a metal bezel (not shown). Suitable gaskets may be provided to provide a weather-tight seal and a conductive path for radio frequency interference mitigation, it being appreciated that the cover lens may be coated with a transparent conductive film to provide radio frequency interference mitigation. In another embodiment, the cover lens and housing may be sealed to provide a gas-tight enclosure 62 preferably filled with an inert (non-reactive) gas. A preferred gas is helium, although other gases may be used such as carbon dioxide, nitrogen, argon, etc. The fill pressure preferably is about 1 atmosphere, although higher pressures will improve the dielectric breakdown characteristics. As will be appreciated, the pressurized enclosure provides a constant internal pressure which prevents internal arcing from the below described electrodes to any surrounding conductive reflective surface, such as the below described reflective coating on the reflector.

Because the light emitting arc of the HID bulb 52 is typically of relatively small dimension when compared to a quartz halogen bulb, a narrow beam of light normally would be emergent from the lamp 28,30. This may be desirable for some applications. However, to match the output beam of a conventional quartz halogen landing or taxi lamp, the cover lens preferably is configured to provide a corrective configuration that spreads the light beam as needed to provide the desired output beam. Alternatively or additionally, the reflector may be reconfigured to provide the desired output beam. Regarding the reflector, the f-number may be selected to increase beam divergence and match the optical output of a prior art landing light and/or taxi light. The full aperture to focal length ratio may range from 2.4 to 8.3, with a preferred value being about 5.3.

Figure 5:
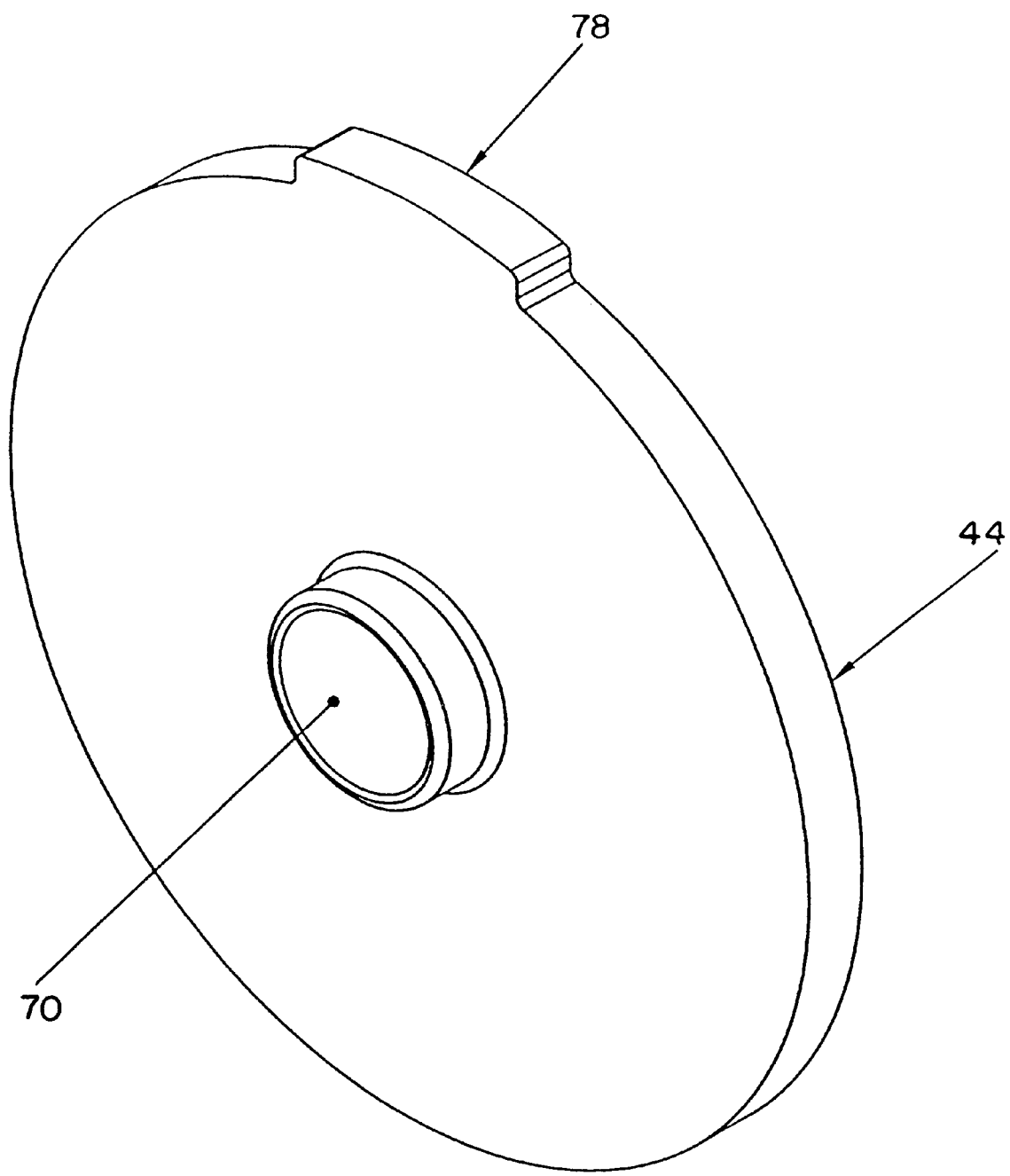
FIG. 5 is a rear perspective view of the lens used in the HID lamp unit of FIG. 3.

In the embodiment shown in FIGS. 3–5, the cover lens 44 includes at its inner side nearest the reflector, preferably integrally with the cover lens, a rearwardly projecting central portion 68 having a spherical concave reflective surface 70 coaxial with the arc of the HID bulb and the reflective surface 60 of the reflector 42. With this arrangement, the central region of the light that is forwardly emitted from the HID lamp is redirected by the lens reflector back through the lamp and onward to the reflector 42 where it is once again redirected by the reflector to contribute to the substantially collimated beam that emerges from the reflector as a result of light directly impinging thereon from the bulb. The lens reflector 68 need not be unitary with the lens. For example, the lens reflector may be a detachable metallic lens reflector and the lens may be an annular disc of heat resistant glass such as Vycor glass or quartz.

The focal point of the lens reflector 68 may be coincident with the center of curvature of said reflector and may additionally be held in coincidence with the central portion of the bulb arc. The lens reflector focal distance may be the minimum acceptable to prevent mechanical interference, and such focal distance should provide sufficient thermal isolation to prevent heat damage of the lens reflector's active surface 70. Since the arc of the bulb 52 is elongate, any light emergent away from the central portion of the arc will not be redirected through the center of the arc and therefore will not emerge from the reflector in a collimated form so some loss of collimation will occur. The size of the lens reflector may be selected so that the reflector intercepts as much as possible the light that is not first intercepted by the parabolic reflector surface 60. The size of the lens reflector is further related to the focal length of the parabolic reflector surface 60 and the lens reflector focal length in that the focal length of parabolic surface 60 should be greater than the focal length of the lens reflector; otherwise the lens reflector will block a substantial portion of the emergent collimated beam directed by the parabolic surface 60. Preferably, light that would not have first been intercepted by the parabolic surface 60 is intercepted by the lens reflector. It is noted that a change in the f-number can vary the divergence of the emitted beam and a change in the size of the lens reflector can vary the width of the beam, for example to widen the beam by not intercepting light emerging directly from the lamp which would normally escape the housing 26.

Figure 6:
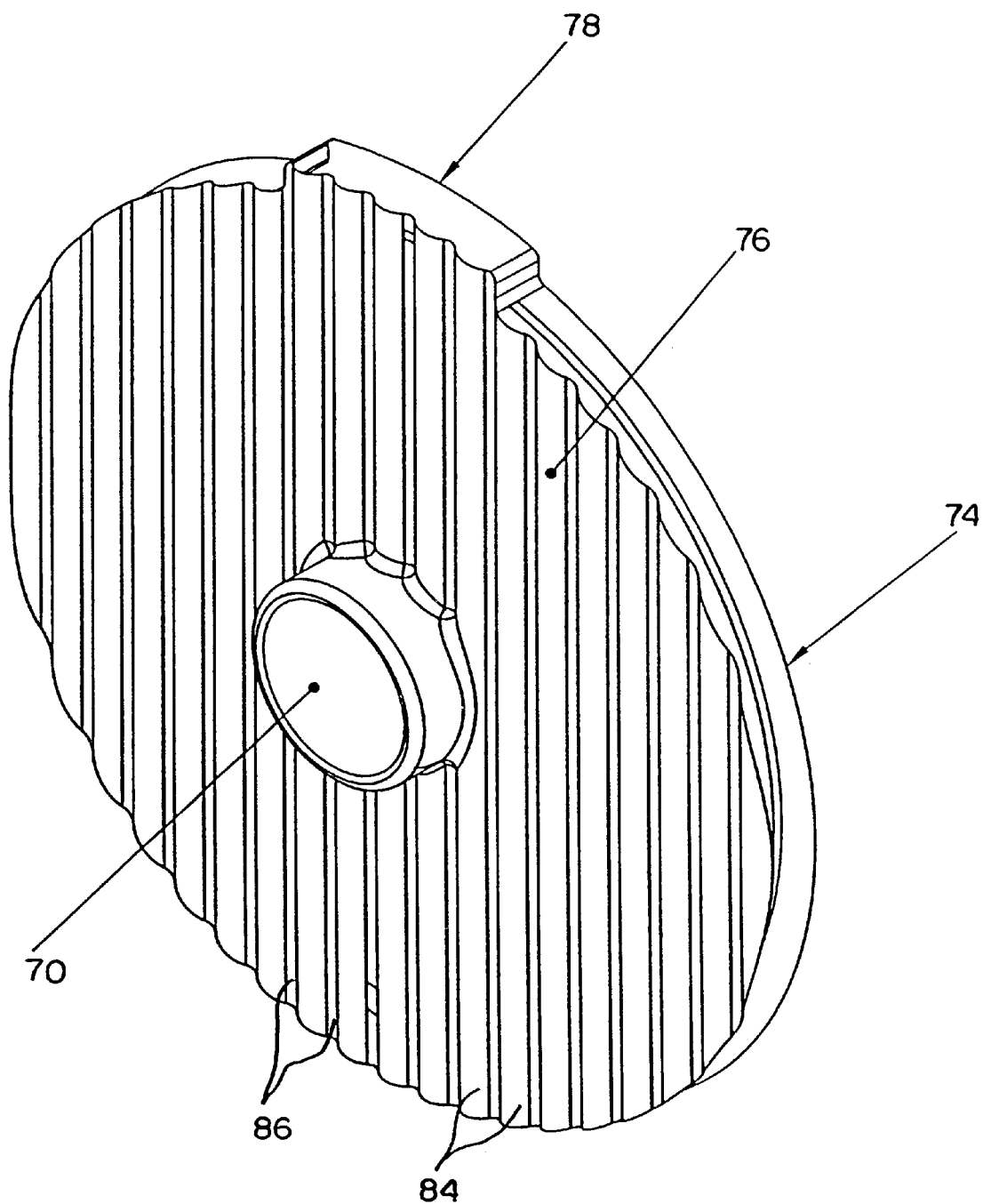
FIG. 6 is a rear perspective view of another embodiment of lens that may be used.

As illustrated in FIG. 6, the cover lens may additionally or alternatively may include a diverging lens structure 74 having a lenticular array 76, as is desired for use in a taxi lamp. As shown, the cover lens may also include the spherical reflector 70, and also a locating key or tab 78 that mates with a slot 80 in the housing 46 (FIG. 4).

The inner face of the lens structure 74 is provided, on the surface thereof which faces the reflector 42 (FIG. 3), with a plurality of spatially displaced parallel spreader optic bars or bands 84. These bands comprise elongated arcuate projections in the form of cylindrical surfaces that are separated from each other by generally flat areas 86. The spreaders 44 are shallow in the interest of reducing light loss while redirecting the reflected light along aline which is transverse to the axes of the spreaders 44. Accordingly, the light produced by lamp is visible over a much greater angle than would be the case if the spreaders 44 were not employed. The flats between the spreaders allow the passage of direct light rays with minimum attenuation.

Thus, the lenticular array functions to spread the light beam horizontally, by deviating portions of the outgoing, substantially parallel, reflected light rays emerging after reflection to fill in spatial regions where insufficient radiation is present. This yields a distribution closely matching that of prior art taxi lights.

Figure 7:
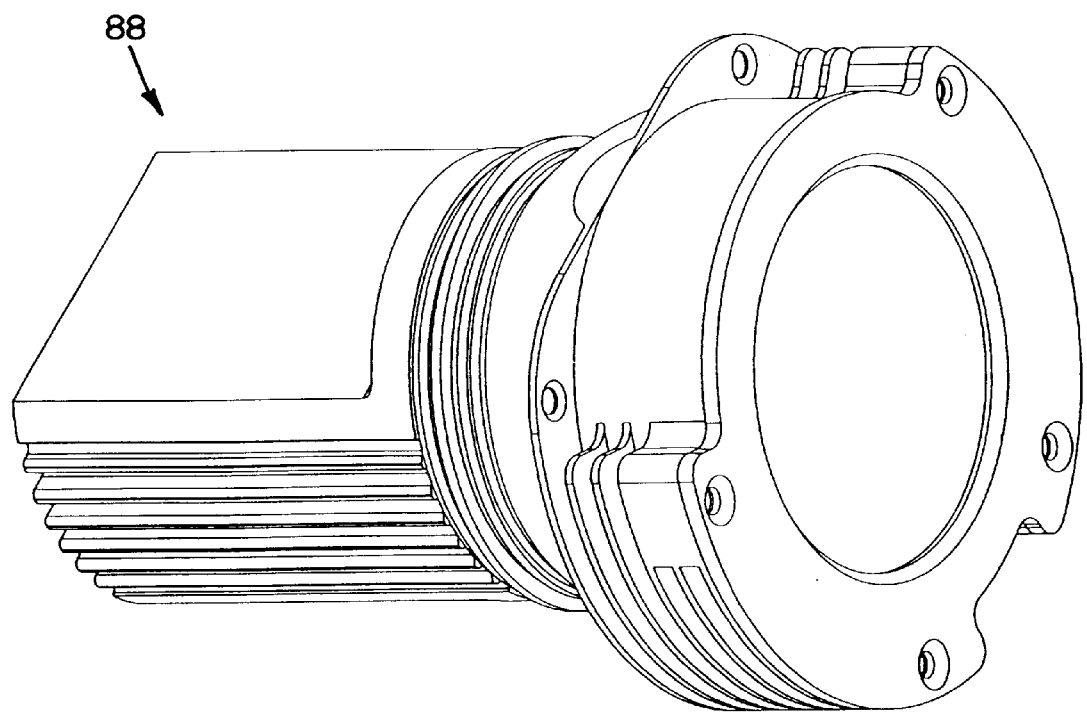
FIG. 7 is a perspective view of another embodiment of an HID lamp unit according to the invention.
Figure 8:
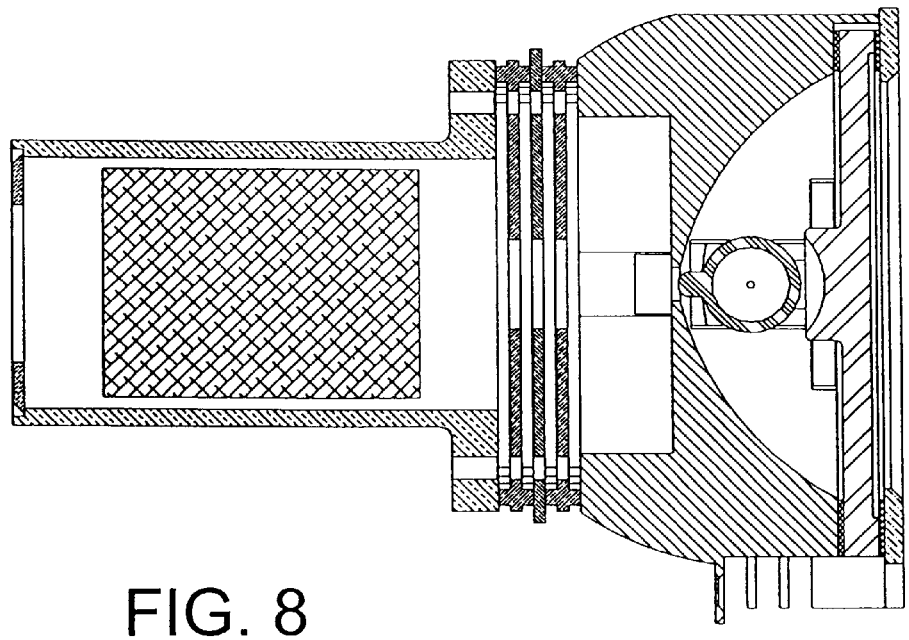
FIG. 8 is a sectional view of the HID lamp unit of FIG. 7.
Figure 9:
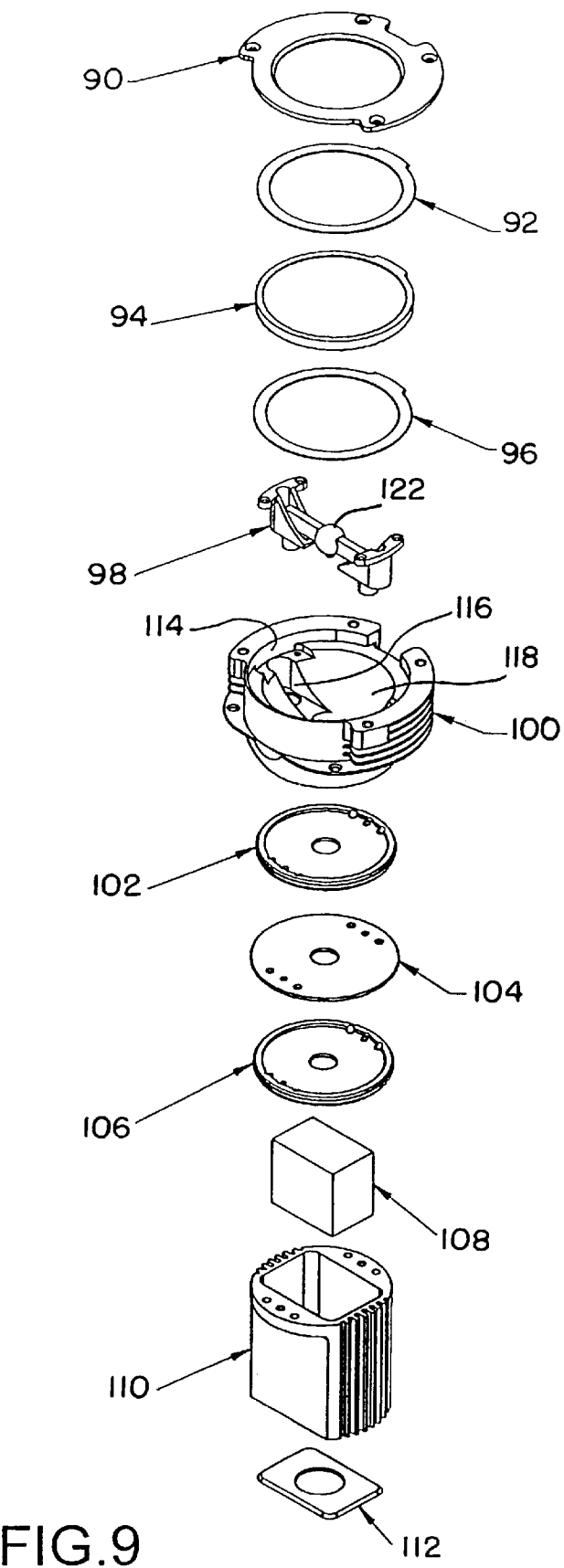
FIG. 9 is an exploded perspective view of the HID lamp of FIG. 7.

Referring now to FIGS. 7–9, a practical application of the above described principles of the invention is illustrated. Going from right to left in FIGS. 7 and 8 and from top to bottom in FIG. 9, an HID lamp 88 comprises a lens bezel 90, an outer lens gasket 92, a cover lens 94, an inner lens gasket 96, a bulb assembly 98, a reflector 100, a forward insulator 102, a heat reflector 104, a rearward insulator 106, an ignitor 108, an enclosure 110 and a back cover 112. As illustrated, the front end of the reflector 100 has a pocket 114 for receiving the outer and inner gaskets 92 and 96 with the cover lens 94 sandwiched therebetween. The gaskets and cover lens are captured under compression between the bottom of the pocket and the lens bezel.

The reflector 100 also includes opposed T-shape slots 116 opening to the reflective surface 118 thereof. The slots hold opposite ends of the bulb assembly 98 which includes an HID bulb 122 and electrical terminals for connection to the ignitor 108 via wire leads (not shown). The insulators 102 and 106 and the heat reflector 104 function to shield the ignitor 108 from the heat of the HID bulb 122.

Although the invention has been shown and described with respect to certain preferred embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. An aircraft landing and taxi light system comprising an HID landing lamp, an HID taxi lamp, an HID lamp power control circuitry for the lamps, and a housing containing the landing lamp, taxi lamp and power control circuitry.

2. A system as set forth in claim 1, wherein the power control circuitry includes a ballast, and the ballast is housed in the enclosure separate from the lamps.

3. A system as set forth in claim 2, wherein at least one of the lamps includes an ignitor as a part thereof, and the ignitor is connected by a cable to the ballast.

4. An aircraft light system comprising a pair of HID lamps and a shard ballast which provides power to both lamps.

5. A method of replacing non-HID landing and taxi lights in an aircraft including a housing for the non-HID landing and taxi lights in side-by-side relationship, comprising installing an HID landing light, an HID taxi light and a power control device in the space originally designed to accommodate the non-HID landing and taxi lights.

6. A method as set forth in claim 5, wherein the HID landing and taxi lights are installed in the space originally designed to be occupied by one of the non-HID landing lights, and the power control device is installed in the space originally designed to be occupied by the other of the non-HID landing lights.

7. An HID lamp comprising a housing, an HID bulb supported within the housing, a lens for passage of light from the HID bulb out of the housing, a primary reflector surface disposed behind the HID bulb, and a secondary reflector surface disposed in front of the bulb for reflecting light from the bulb back through the bulb for further forward reflection from the primary reflector surface through the lens.

8. A lamp as set forth in claim 7, wherein the primary reflector is a parabolic reflector surface and the HID bulb has an arc located at about the focal point of the primary reflector surface.

9. A lamp as set forth in claim 8, wherein the secondary reflector surface is a concave spherical surface having a radius of curvature less than the focal length of the parabolic reflector.

10. A lamp as set forth in claim 7, wherein the secondary reflector surface is integral with the lens.

11. A lamp as set forth in claim 7, wherein the primary reflector surface is integral with the housing.

12. A lamp as set forth in claim 7, wherein the lens has a lenticular array including a plurality of cylindrical surface elements.

13. A method of retrofitting an aircraft lighting fixture that includes a housing for non-HID landing and taxi lights in side-by-side relationship, comprising the step of providing mounting structure in the housing for accepting installation of an HID landing light, an HID taxi light and a power control device in the space originally designed to accommodate the non-HID landing and taxi lights.

14. A method as set forth in claims 13, further comprising the step of installing an HID landing light, an HID taxi light and a power control device in the space originally designed to accommodate the non-HID landing and taxi lights.

* * * * *

UNITED STATES PATENT AND TRADEMARK OFFICE
CERTIFICATE OF CORRECTION

PATENT NO. : 6,439,752 B1  
DATED : August 27, 2002  
INVENTOR(S) : John T. Petrick It is certified that error appears in the above-identified patent and that said Letters Patent is hereby corrected as shown below:

<u>Column 1,</u>  
Between lines 25 and 26, insert the heading -- SUMMARY OF THE INVENTION --;  
Between lines 47 and 48, insert the following paragraph  
-- According to another aspect of the invention, an aircraft light system comprises a pair of HID lamps and a shared ballast which provides power to both lamps --;

<u>Column 5,</u>  
Line 8, "aline" should read -- a line --;

<u>Column 6,</u>  
Line 13, "shard" should read -- shared --;  
Line 56, "claims" should read -- claim --.

Signed and Sealed this

Tenth Day of June, 2003

JAMES E. ROGAN  
*Director of the United States Patent and Trademark Office*